(12) United States Patent
Turtinen et al.

(10) Patent No.: US 12,501,352 B2
(45) Date of Patent: Dec. 16, 2025

(54) DETERMINATION OF ACTIVE TIME WITH DISCONTINUOUS RECEPTION GROUPS

(71) Applicant: Nokia Technologies Oy, Espoo (FI)

(72) Inventors: Samuli Turtinen, Ii (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 442 days.

(21) Appl. No.: 17/796,292

(22) PCT Filed: Feb. 12, 2020

(86) PCT No.: PCT/CN2020/074950
§ 371 (c)(1),
(2) Date: Jul. 29, 2022

(87) PCT Pub. No.: WO2021/159352
PCT Pub. Date: Aug. 19, 2021

(65) Prior Publication Data
US 2023/0145687 A1    May 11, 2023

(51) Int. Cl.
*H04W 48/18* (2009.01)
*H04W 72/12* (2023.01)
*H04W 76/28* (2018.01)

(52) U.S. Cl.
CPC .......... *H04W 48/18* (2013.01); *H04W 72/12* (2013.01); *H04W 76/28* (2018.02)

(58) Field of Classification Search
CPC ...... H04W 48/18; H04W 72/12; H04W 76/28
See application file for complete search history.

(56) References Cited

U.S. PATENT DOCUMENTS

2016/0021646 A1  1/2016  Hu et al.
2016/0192433 A1  6/2016  Deenoo et al.
(Continued)

FOREIGN PATENT DOCUMENTS

CN  109600843 A  4/2019
CN  113260089 B  3/2024
(Continued)

OTHER PUBLICATIONS

Office action received for corresponding Chinese Patent Application No. 202110190366.X, dated May 11, 2023, 8 pages of office action and no page of translation available.
(Continued)

*Primary Examiner* — Jackie Zuniga Abad
(74) *Attorney, Agent, or Firm* — SQUIRE PATTON BOGGS (US) LLP

(57) ABSTRACT

Example embodiments of the present disclosure relate to an apparatus, method and computer readable storage medium for determining active time with a plurality of discontinuous reception (DRX) groups. In example embodiments, if first transmission is initiated from a device, at least a first DRX group is selected from a plurality of DRX groups. The plurality of DRX groups is configured for the device and associated with a plurality of DRX configurations. The apparatus is further caused to determine first active time for the first DRX group based on a first DRX configuration of the plurality of DRX configurations associated with the first DRX group. Further, the device is allowed to monitor second transmission to the device in the first active time.

19 Claims, 3 Drawing Sheets

(56) References Cited

U.S. PATENT DOCUMENTS

| | | |
|---|---|---|
| 2017/0202052 A1 | 7/2017 | Xu et al. |
| 2019/0053151 A1 | 2/2019 | Sammour et al. |
| 2019/0223162 A1 | 7/2019 | Suzuki et al. |
| 2020/0022210 A1 | 1/2020 | Heo et al. |
| 2020/0045768 A1* | 2/2020 | He .................... H04W 76/28 |
| 2020/0304968 A1* | 9/2020 | Lee .................... H04W 4/40 |

FOREIGN PATENT DOCUMENTS

| | | |
|---|---|---|
| GB | 2493128 A | 1/2013 |
| WO | 2010/078365 A1 | 7/2010 |

OTHER PUBLICATIONS

"LS on secondary DRX group", 3GPP TSG-RAN2 Meeting #108, R2-1916597, 3GPP RAN WG2, Nov. 18-22, 2019, 2 pages.

"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.

"3rd Generation Partnership Project; Technical Specification Group Radio Access Network; NR; Radio Resource Control (RRC) protocol specification (Release 15)", 3GPP TS 38.331, V15.8.0, Dec. 2019, pp. 1-532.

"Power saving enhancements for carrier aggregation", 3GPP TSG-RAN WG2 Meeting #105bis, R2-1903049, Agenda: 11.11.4.3, Qualcomm Inc, Apr. 8-12, 2019, pp. 1-3.

"DRX with Multiple Numerologies", 3GPP TSG-RAN2 Meeting #97bis, R2-1702605, Agenda: 10.3.1.7, Huawei, Apr. 3-7, 2017, 4 pages.

International Search Report and Written Opinion received for corresponding Patent Cooperation Treaty Application No. PCT/CN2020/074950, dated Nov. 18, 2020, 9 pages.

"Discussion on Single MAC and Dual Mac", 3GPP Tsg-Ran WG2 Meeting #84, R2-133865, Agenda: 7.2.4, Samsung, Nov. 11-15, 2013, pp. 1-4.

"Email report [107bis#49][NR TEI16] cDRX enhancement for Ca", 3GPP TSG-RAN2 Meeting #108, R2-1915292, Agenda: 6.20.2, Ericsson, Nov. 18-22, 2019, pp. 1-20.

Indonesian Office Action corresponding to ID Application Number P00202209269, dated Oct. 15, 2025.

* cited by examiner

DETERMINATION OF ACTIVE TIME WITH DISCONTINUOUS RECEPTION GROUPS

RELATED APPLICATION

This application claims priority to PCT Application No. PCT/CN2020/074950, filed on Feb. 12, 2020, each of which is incorporated herein by reference in its entirety.

FIELD

Example embodiments of the present disclosure generally relate to the field of communication, and in particular, to an apparatus, method and computer readable storage medium for determining active time with a plurality of Discontinuous Reception (DRX) groups or active transmissions on a Bandwidth Part (BWP).

BACKGROUND

The Discontinuous Reception (DRX) technology is applied for power saving. User equipment (UE) in a DRX mode can only wake up for monitoring downlink (DL) transmission in active time. For example, after a UE in a DRX mode initiates uplink (UL) transmissions, the active time for the UE to monitor DL transmission may include time duration while a contention resolution timer is running, a scheduling request (SR) is pending, or a physical downlink control channel (PDCCH) transmission has not been received upon completion of successful contention free random access (CFRA). In other time, the UE will go to sleep for saving UE power consumption.

In order to enhance power saving, a plurality of DRX groups may be configured in different frequency ranges (FRs). Different DRX groups may correspond to different DRX configurations. In the context of the present disclosure, the DRX configuration may comprise any suitable configuration related to a DRX mode such as active periodicity, active time and other features of the DRX mode.

For example, Frequency Range 1 (FR1) (410-7125 MHz) cells and Frequency Range 2 (FR2) (24250-52600 MHz) cells may both be configured to a UE via Carrier Aggregation (CA). The FR2 and FR1 cells may be associated with different DRX groups. For example, the FR2 cells may be configured with separate and shorter DRX active time duration compared to the FR1 cells. Accordingly, the FR2 cells may go to sleep more quickly, thereby reducing more power consumption.

For New Radio (NR) access on licensed spectrum, different events such as a scheduling request (SR) failure (that is, a maximum number of SRs are transmitted but no grant can be received) always triggers a random access (RA) procedure. If there is no resource for the RA procedure on a current active BWP, a terminal device may automatically switch to an initial BWP and perform the RA procedure there. If the RA procedure fails, a Radio Link Failure (RLF) will be triggered.

For NR access on unlicensed spectrum (NR-U), a Listen Before Talk (LBT) procedure needs to be performed by the terminal device prior to any uplink (UL) transmission. Some solutions consider a systematic UL LBT failure as a trigger for the terminal device to automatically switch to another BWP and perform the RA procedure there.

SUMMARY

In general, example embodiments of the present disclosure provide an apparatus, method and computer readable storage medium for determining active time with a plurality of DRX groups.

In a first aspect, an apparatus is provided which comprises at least one processor and at least one memory including computer program code. The at least one memory and the computer program code are configured to, with the at least one processor, cause the apparatus to select at least a first DRX group from a plurality of DRX groups if first transmission is initiated from a device. The plurality of DRX groups is configured for the device and associated with a plurality of DRX configurations. The apparatus is further caused to determine first active time for the first DRX group based on a first DRX configuration of the plurality of DRX configurations associated with the first DRX group, to allow the device to monitor second transmission to the device in the first active time.

In a second aspect, a method is provided. In the method, if first transmission is initiated from a device, at least a first DRX group is selected from a plurality of DRX groups. The plurality of DRX groups is configured for the device and associated with a plurality of DRX configurations. The apparatus is further caused to determine first active time for the first DRX group based on a first DRX configuration of the plurality of DRX configurations associated with the first DRX group. Further, the device is allowed to monitor second transmission to the device in the first active time.

In a third aspect, there is provided an apparatus comprising means for performing the method according to the second aspect.

In a fourth aspect, there is provided a computer readable storage medium comprising program instructions stored thereon. The instructions, when executed by a processor of an apparatus, cause the apparatus to perform the method according to the second aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
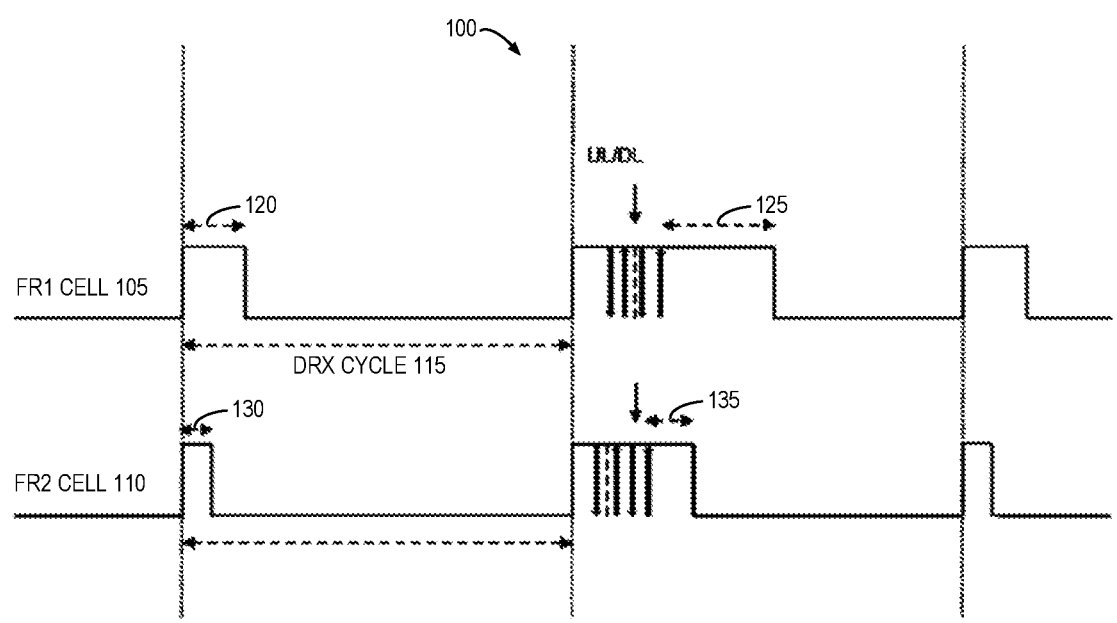
FIG. 1 illustrates an example of DRX configurations for FR1 and FR2 cells.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure. The UE may also correspond to Mobile Termination (MT) part of the integrated access and backhaul (IAB) node (a.k.a. a relay node).

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like. A relay node may correspond to Distributed Unit (DU) part of the IAB node.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

When both FR1 and FR2 cells are configured via CA, FR1 and FR2 cells may be configured with different DRX groups for power saving enhancement. For example, the FR2 cells may correspond to a DRX group with separate and shorter active time duration compared to the FR1 cells.

FIG. 1 shows an example 100 of DRX configurations for FR1 and FR2 cells. In this example, a FR cell 105 and a FR cell 110 are configured with different DRX groups associated with different DRX configurations. Compared to the FR1 cell 105, the FR2 cell 110 may be configured with shorter timer durations that generally results to shorter active time duration. As shown, in a DRX cycle 115, which represents periodicity for a UE to wake up for monitoring DL transmissions, active time 120 or 125 for the FR1 cell 105 is longer than active time duration 130 or 135 for the FR2 cell 110. Accordingly, the UE will be in an active state for a shorter time period in FR2 cell 110 than in FR1 cell 105 to save more power consumption.

By now, in the third Generation Partnership Projection (3GPP) standardization, it is agreed that parameters drx-onDurationTimer and drx-InactivityTimer can be configured separately for different DRX groups. The parameter drx-onDurationTimer indicates time duration (such as the active time duration 120 or 130) at the beginning of a DRX cycle. The parameter drx-InactivityTimer indicates time duration (such as the active time duration 125 or 135) after a PDCCH occasion in which a PDCCH indicates a new UL or DL transmission to the UE. The DRX cycle may be common for these DRX groups.

It is proposed to apply a first DRX configuration such as a primary DRX configuration to FR1 cells and apply a second DRX configuration such as a secondary DRX configuration to FR2 cells. However, it is still for further study (FFS) whether time duration indicated by drx-onDurationTimer or drx-InactivityTimer for the secondary DRX configuration is shorter than that for the primary DRX configuration. Moreover, a combination of cross-carrier scheduling and the secondary DRX group is not supported.

For a UE in a DRX mode, the active time may include time duration indicated by a parameter drx-onDurationTimer, drx-InactivityTimer, drx-RetransmissionTimerDL, drx-RetransmissionTimerUL or ra-ContentionResolutionTimer. The parameter drx-RetransmissionTimerDL indicates the maximum duration until a DL retransmission is received, the parameter drx-RetransmissionTimerUL indicates the maximum duration until a grant for UL retransmission is received, and the parameter ra-ContentionResolutionTimer indicates time duration for a contention resolution timer. The active time also includes time duration while a Scheduling Request (SR) is sent on a Physical Uplink Control Channel (PUCCH) and is pending, and/or time duration while a PDCCH indicating a new transmission has not been received upon successful reception of a random access response for a random access preamble not selected from among contention-based random access (CBRA) preambles. After the UE initiates UL transmission, the UE will monitor corresponding DL transmission in the active time.

The inventor notices that an approach is needed for a UE configured with a plurality of DRX groups to determine the active time in the scenario where the UE-initiated transmission occurs.

Example embodiments of the present disclosure propose a scheme of determining active time for a device such as a UE after the device initiates transmissions. The device is configured with a plurality of DRX groups that are associated with a plurality of DRX configurations. The DRX configuration may be related to any suitable DRX feature such as a DRX cycle, various timers, and the like. Different DRX groups may be associated with different DRX configurations. It is also possible that two or more DRX groups are associated with the same DRX configuration.

With the scheme, upon the initiation of the transmission from the device, at least one DRX group is selected from a plurality of DRX groups. Further, for the selected DRX group, active time is determined based on the corresponding DRX configuration for the device to monitor transmission to the device.

For example, in the scenario where a UE initiates UL transmission such as a Random Access (RA) or a Scheduling Request (SR), the UE may select one or more DRX groups from a plurality of configured DRX groups and determine the active time for the selected DRX group based on the corresponding DRX configuration. Then, the UE will monitor for DL transmission in the active time. Accordingly, a network device such as a base station may use the same rule or criterion to identify the active DRX group(s) upon reception of the UE initiated signal. The network device may further perform DL transmissions to the UE in the corresponding active time for the DRX group(s). The scheme may allow more UE power saving for UE initiated actions when not all of the DRX groups need to be in active time.

Short DRX and Long DRX cycle may be configured for the multiple DRX groups. When both Short DRX cycle and Long DRX cycle are configured for a DRX group, drx-InactivityTimer is used to determine whether the UE uses Short DRX cycle or Long DRX cycle. As the drx-InactivityTimer is separate for each DRX group, handling of drx-ShortCycleTimer, which may indicate the time duration when the UE shall follow the Short DRX cycle, should be specified to support multiple DRX groups. Whenever the drx-InactivityTimer expires for one of the DRX groups, the short cycle timer is restarted; however, the other drx-InactivityTimer may be running or started close to the expiry of the drx-ShortCycleTimer. This will result to other DRX group falling into Long DRX while the other one has ongoing data transmission. Given that the DRX group falling into Long DRX cycle may be configured, e.g., to provide CSI reporting etc. during on-DurationTimer runs for all the configured cells, falling into Long DRX cycle can be problematic.

In some embodiments, drx-ShortCycleTimer is maintained per MAC entity, i.e. common for the multiple DRX groups within the same MAC entity. The drx-ShortCycleTimer may be only started when neither of the drx-InactivityTimer of the DRX groups is running (i.e., both have expired), and Long Cycle may be used for both the DRX groups when drx-ShortCycleTimer expires. It can be further limited that drx-ShortCycleTimer cannot expire if at least one of the drx-InactivityTimers is running.

In some embodiments, drx-ShortCycleTimer is maintained per MAC entity or per DRX group, Short or Long DRX cycle may be used for both groups based on combination of drx-ShortCycleTimer and drx-InactivityTimer status of the DRX groups. If Short DRX cycle is configured and at least one of the drx-InactivityTimers is running, the Short DRX cycle may be used also for the DRX group with drx-InactivityTimer not running regardless of if the drx-ShortCycleTimer expires or has expired.

In some embodiments, drx-ShortCycleTimer is maintained per DRX group. The multiple DRX groups are configured with a separate drx-ShortCycleTimer and only when they all have expired, the Long DRX cycle is used for the DRX groups.

In some embodiments, the multiple DRX groups would use either Short DRX Cycle or Long DRX Cycle at the same time. In another embodiment, the network can configure whether or not one of the DRX groups can fall using the Long DRX cycle regardless of activity in the other DRX group.

In some embodiments, the behavior is conditioned on whether the DRX group is configured to provide, e.g., CSI reports and/or SRS transmissions, etc. concerning the cells in the other DRX groups, e.g. if other DRX group comes with SpCell. If not, the DRX group can fall using the Long DRX cycle regardless of activity in the other DRX groups.

In some embodiments, the NW may configure drx-InactivityTimer of one of the multiple DRX groups to be used to determine if Long or Short DRX cycle of the multiple DRX groups is in use at any given time (i.e., drx-InactivityTimer in other DRX group(s) does not affect on drx-ShortCycleTimer of the MAC entity). In one option, the DRX group which consists the SpCell (PCell/PSCell) is used for this purpose.

As described above, for NR access on licensed spectrum, number of events such as a SR failure (that is, no grant is received after a maximum number of SR transmissions) may always trigger a RA procedure. If there is no resource for the RA procedure on a current active BWP, the terminal device may automatically switch to an initial BWP and perform the RA procedure there.

For NR access on unlicensed spectrum, a LBT procedure needs to be performed by the terminal device prior to any UL transmission. Some solutions consider a systematic UL LBT failure as a trigger for the terminal device such as a UE to automatically switch to another BWP and perform the RA procedure there.

When the UE automatically switches to another BWP (e.g., uplink BWP) and activates it, the UE may start to transmit on uplink resources configured on the new active BWP. Such resources may be, for example, Channel State Information (CSI) reporting resources, Sounding Reference Signal (SRS) resources, Configured Grant (CG) resources, or the like. For example, the UE may report CSI for the BWP; transmit SRS on the BWP, if configured; or (re-) initialize any suspended configured uplink grants of configured grant Type 1 on the active BWP according to the stored configuration, if any.

Upon the UE initiated BWP switching, the suspended CSI, SRS, and Type 1 CG resources are automatically resumed by the UE according to the current specification. As a network (NW) would not be expecting UL transmission from the UE on those resources, the NW may have allocated such resources for other UE or use them for dynamic scheduling. This may lead to collision with other UE(s) transmitting on the same UL resources and/or waste of data. On the other hand, in principle, the NW may even schedule DL transmissions on the Type 1 CG resource occasions as the NW does not expect a UE to transmit on those CG resources—this may lead to severe interference issues for nearby UEs in DL. Furthermore, the UE may stop the ongoing RA procedure due to the CG resources being available—this will lead to a situation where the NW does not expect UE from transmitting, hence does not identify the UE, and UE would not be sending RA preamble to identify itself.

When the RA procedure happens with BWP switching due to consistent LBT failure, it is possible that RA procedure could fail on the switched BWP as well if there is consistent LBT failure there as well and then the UE would switch to another BWP that is not failed yet until it tried all the BWPs configured with Random Access Channels (RA-CHs). Resuming type 1 CG right upon BWP switching would not make sense in such scenarios.

The inventor notices that an approach is needed for a UE autonomous BWP switch where configured uplink resources are resumed without the network knowing about this event.

Example embodiments of the present disclosure provide a scheme for resuming configured uplink resources on the active BWP, so as to at least in part solve the above and other potential problems. According to embodiments of the present disclosure, if the terminal device such as a UE autonomously switches its active BWP, instead of resuming the configured uplink resources at once, the terminal device may resume the configured uplink resource upon completion of the RA procedure. In some embodiments, the UE resumes the configured uplink resource upon reception of explicit signaling from the network device. The explicit signaling to resume the uplink resource may be RRC reconfiguration of the resource, any RRC reconfiguration, or MAC layer signaling. As such, the communication efficiency can be improved.

Figure 2:
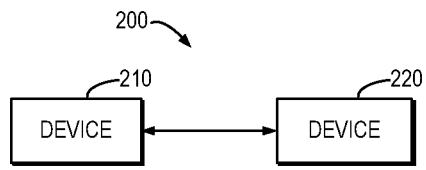
FIG. 2 illustrates an example environment in which example embodiments of the present disclosure can be implemented.

FIG. 2 shows an example environment 200 in which example embodiments of the present disclosure can be implemented.

The environment 200, which may be a part of a communication network, comprises devices 210 and 220 communicating with each other. The number of devices is shown in FIG. 2 only for the purpose of illustration, without suggesting any limitation. The environment 200 may comprise any suitable number of devices that can communicate with each other.

The two devices 210 and 220 may be implemented by any suitable devices. For example, one device 210 or 220 may be implemented by a terminal device such as a UE, and the other device 220 or 210 may be implemented by a network device such as a base station. As another example, the two devices 210 and 220 may be both implemented by terminal devices.

The communication in the environment 200 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employ any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

Either or both of the devices 210 and 220 can be configured with a plurality of DRX groups for power saving. For example, the device 210 may be configured with a plurality of DRX groups associated with a plurality of DRX configurations. The plurality of DRX groups may be configured with Short DRX cycle and Long DRX cycle. When the device 210 initiates transmission to the device 220, the device 210 selects at least one DRX group from the DRX groups and determines the active time for the selected DRX group based on the corresponding DRX configuration. Then, the device 210 will monitor the transmission from the device 220 in the active time. At the device 220, the same rules or criterion can be used to select the DRX group and determine the active time for transmission to the device 210.

Either or both of the devices 210 and 220 can be configured with a plurality of uplink resources on uplink BWP for periodic transmissions. For example, the device 210 may be configured with a plurality of uplink resources associated with at least one of a plurality of CSI reporting, SRS transmission, or configured grant type 1 configurations. When the device 210 initiates autonomous BWP switch, the device 210 performs at least a RA procedure with the device 220 before resuming the configured uplink resources. At the device 220, the same rules or criterion can be used to initiate autonomous BWP switch and perform at least the RA procedure with the device 210.

Figure 3:
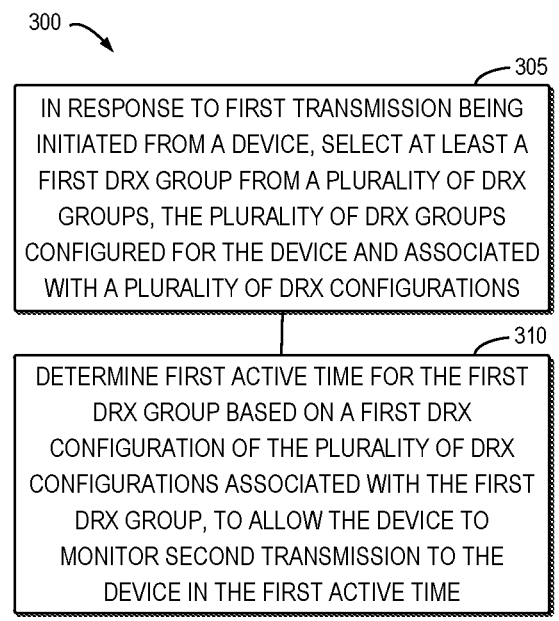
FIG. 3 illustrates a flowchart of an example method of data encryption according to some example embodiments of the present disclosure.

FIG. 3 shows a flowchart of an example method 300 according to some example embodiments of the present disclosure. The method 300 can be implemented at either a network side or a terminal side or at either a transmitter side or a receiver side. For the purpose of discussion, the method 300 will be described in an example scenario where the device 210 initiates transmission to the device 220. In this scenario, the method 300 may be implemented by either the device 210 or 220.

At block 305, after the device 210 initiates transmission (referred to first transmission) to the device 220 or another device (not shown), at least a DRX group (referred to as a first DRX group) is selected from a plurality of DRX groups that is configured for the device 210 and associated with a plurality of DRX configurations. As an example, different DRX groups may be associated with different DRX configurations. It is also possible that one DRX configuration may be used for more than one DRX group.

The first transmission may comprise any suitable transmission initiated by the device 210, and any suitable criterion or rules may be used for the selection of the first DRX group. In some example embodiments, the first transmission may comprise random access initiated by the device 210. For example, when the device 210 intends to establish a connection with the device 220, the device 210 may initiate the RA. The RA may be of any suitable type such as contention-based random access (CBRA) and contention free random access (CFRA).

In the scenario of dual connectivity (DC), the device 210 may be configured with a primary cell (PCell) from a master cell group (MCG) or a primary secondary cell (PSCell) from a secondary cell group (SCG) and one or more secondary cells. The PCell and PSCell will also be referred to as a special cell (SpCell) collectively. If the RA is initiated on the SpCell, a DRX group associated with the SpCell may be selected as the first DRX group.

Alternatively, the RA may be initiated on the SCell. In some example embodiments, the DRX group associated with the SpCell may also be selected as the first DRX group. The SpCell may maintain more information about the device 210 and may be more robust and may be used for scheduling a response by the device 220 to the RA initiated by device 210. Accordingly, the selection of the DRX group associated with the SpCell may be more robust and efficient for subsequent transmissions. In some other example embodiments, in addition to the DRX group associated with the SpCell selected as the first DRX group, a DRX group associated with the SCell may further be selected as a second DRX group. The DRX groups associated with the SpCell and SCell may be selected at the same time or in an order. The selection of the DRX groups associated with both the SpCell and SCell may further improve the transmission robustness and efficiency. It may be also possible that only the DRX group associated with the SpCell is selected when the RA is initiated on either the SpCell or SCell.

In some example embodiments, the first transmission initiated by the device 210 may comprise a scheduling request (SR). For example, if data arrives at a buffer of the device 210, the device 210 may send the SR to request uplink resources for transmission of the data. When the SR has been sent and is pending, the first DRX group may be selected based on a cell for the device 210.

The cell may comprise any suitable cell associated with the device 210. In some example embodiments, the device 210 may use a logical channel (LCH) to trigger a SR. For example, if data is available on a LCH, the device 210 may trigger a SR based on the LCH. Based on predetermined or configured LCH mapping restrictions, LCH may be mapped to a plurality of cells that can serve the device 210. In this case, a DRX group associated with a cell of the plurality of cells to which the LCH is allowed to be mapped may be selected as the first DRX group.

In addition to the LCH triggering the SR, there may be other LCHs with available data. In some example embodiments, a DRX group associated with a cell to which a LCH with data to be transmitted is allowed to be mapped may be selected as the first DRX group.

In some example embodiments, the cell for determining the first DRX group may be a cell for carrying the SR. For example, if the SR is sent by the device 210 in a cell, the DRX group associated with the cell may be selected. In the case that the device 210 is configured with a SpCell and a SCell in DC, the device 210 may send the SR in the SpCell. In this case, the DRX group associated with the SpCell that carries the SR may be selected.

The SCell may also be used to carry the SR. For example, the device 210 may send the SR on a Physical Uplink Control Channel (PUCCH) of the SCell. In this case, the DRX group associated with the SCell may be selected. Alternatively, it may be still the DRX group associated with the SpCell to be selected, by considering the robustness of the SpCell. In some example embodiments, the DRX groups associated with both the SpCell and SCell may be selected.

In some example embodiments, the selection criterion of one or more DRX groups may be configured by a network. For example, a DRX group of the plurality of DRX groups may be configured to be activated by an active configuration. Accordingly, the first DRX group may be selected based on the activation configuration. In addition to the first DRX group, the active configuration may activate one or more other DRX groups and even all the DRX groups. In the case that the activation configuration is further used to activate another DRX group (referred to as a third DRX group), both the first and third DRX groups may be selected based on the activation configuration.

The activation configuration may be configured in any suitable way. The activation configuration may be configured in a fixed, semi-statistic and/or dynamic way. For example, the activation configuration may be set in a network during initial network deployment. Accordingly, a network device may have an initial activation configuration. The activation configuration may be indicated to a terminal device when the terminal device has access to the network. Alternatively or in addition, the activation configuration by be adjusted semi-statistically or dynamically. The adjusted activation configuration may be carried in physical (PHY) layer or L1 signaling such as Downlink Control information (DCI) or in medium access control (MAC) layer or L2 signaling.

The active configuration may indicate a DRX group to be activated in any suitable way. In some example embodiments, the active configuration may directly indicate which one(s) of the plurality of DRX groups should be activated. In some other example embodiments, the active configuration may indicate whether all or a concerned one(s) of the plurality of DRX groups should be activated, or whether the remaining DRX groups other than the concerned one(s) of the plurality of DRX groups should also be activated.

After at least the first DRX group is selected, at block 310, active time (referred to as first active time) for the first DRX group is determined based on a DRX configuration of the plurality of DRX configurations associated with the first DRX group. For the purpose of discussion, the DRX configurations corresponding to the first, second and third DRX groups will be referred to as a first DRX configuration, a second DRX configuration and a third DRX configuration, respectively.

The first active time may comprise time duration within a DRX cycle or separate pieces of time duration within several DRX cycles. In the first active time, the device 210 can monitor transmission (referred to as second transmission) from the device 220 or another device.

The determination of the first active time and the implementation of the second transmission may be related with the first transmission initiated by the device 210. In the example embodiments where the RA is initiated by the device 210, the first active time may include the time duration while ra-ContentionResolutionTimer is running, or the time duration while the device 210 is waiting for a PDCCH indicating a new transmission after the completion of a successful RA procedure. The second transmission may comprise a random access response or the like. In the example embodiments where the SR is sent by the device 210, the first active time may comprise the time duration while the SR is pending and no UL grant has been received. The second transmission may comprise a UL grant, for example.

In some example embodiments, wakeup signaling may be used to inform the device 210 whether to wake up during OnDuration of a next DRX cycle, to further to reduce the power consumption. The wakeup signaling may be called as DCP (Downlink Control Information (DCI) with Cyclic Redundancy Check (CRC) scrambled by Power Saving Radio Network Temporary Identifier (PS-RNT)) which consist of a wake up indication. The wakeup signaling may be sent at a time offset before the start of the next DRX cycle. If the first active time spans over an occasion or subset of occasions or all occasions for the wakeup signaling within a DRX cycle, the wakeup signaling cannot be detected by the device 210. Accordingly, the device 210 cannot determine whether there is transmission directed to itself within a next DRX cycle.

In some example embodiments, if the first active time spans over an occasion or subset of occasions or all occasions for the wakeup signaling within a DRX cycle, a further DRX group (referred to as a fourth DRX group) may be selected to be active in the next DRX cycle so that the device 210 will not miss the transmission with the next DRX cycle. In this case, further active time (referred to as fourth active time) within the next DRX cycle may be determined for the fourth DRX group based on a further DRX configuration (referred to as a fourth DRX configuration) associated with the fourth DRX group. In this way, one or more other DRX groups may be active in the next occasion to further improve the transmission efficiency.

It may be also possible that other DRX groups only obey the wakeup signaling. For example, when the first active time overlaps the occasion or subset of occasions or all occasions for the wakeup signaling within a DRX cycle, no other DRX groups will be activated in the next DRX cycle.

As discussed above, the method 300 can be implemented at either a network side or a terminal side and at either the device 210 or 220. For example, in the scenario where the device 210 initiates the first transmission to the device 220, the device 210 will select at least the first DRX group to be activated and determine the first active time based on the corresponding first DRX configuration. Then, the device 210 can monitor the second transmission from the device 220 in the first active time. At the device 220, the same rules are used to identify the first DRX group to be activated and determine the corresponding first active time for transmission to the device 210.

In some example embodiments, the device 210 may resume and/or (re-)initialize CSI reporting, SRS transmissions, and/or Type 1 CG when BWP switching initiated by the device 210 happens based on a synchronized trigger with the device 220. In some example embodiments, the device 210 may resume and/or re-initialize CSI reporting, SRS transmissions, and/or Type 1 CG upon completion of the RA procedure. For example, if the ongoing Random Access procedure associated with this Serving Cell is successfully completed upon reception of this Physical Downlink Control Channel (PDCCH) transmission addressed to Cell Radio Network Temporary Identifier (C-RNTI), the device 210 may resume and/or re-initialize the CSI reporting, SRS transmissions, and/or Type 1 CG on the active BWP.

For example, the RA procedure can be considered as complete and/or successfully completed if notification of a reception of a PDCCH transmission on the search space indicated by recoverySearchSpaceId is received from lower layers on the Serving Cell where the preamble was transmitted; and if PDCCH transmission is addressed to the C-RNTI; and if the contention-free Random Access Preamble for a beam failure recovery request was transmitted by the MAC entity. For example, the RA procedure can be considered as complete and/or successfully completed if a downlink assignment has been received on the PDCCH for the RA-RNTI and the received TB is successfully decoded and if the Random Access Response contains a MAC subPDU with Random Access Preamble identifier corresponding to the transmitted PREAMBLE_INDEX and if the Random Access Preamble was not selected by the MAC entity among the contention-based Random Access Preamble(s). For example, the RA procedure can be considered as complete and/or successfully completed if notification of a reception of a PDCCH transmission of the SpCell is received from lower layers and if the C-RNTI MAC Control Element (CE) was included in Msg3 and if the Random Access procedure was initiated for beam failure recovery and the PDCCH transmission is addressed to the C-RNTI. For example, the RA procedure can be considered as complete and/or successfully completed if notification of a reception of a PDCCH transmission of the SpCell is received from lower layers and if the C-RNTI MAC CE was included in Msg3 and if the Random Access procedure was initiated by a PDCCH order and the PDCCH transmission is addressed to the C-RNTI. For example, the RA procedure can be considered as complete and/or successfully completed if notification of a reception of a PDCCH transmission of the SpCell is received from lower layers and if the C-RNTI MAC CE was included in Msg3 and if the Random Access procedure was initiated by the MAC sublayer itself or by the RRC sublayer and the PDCCH transmission is addressed to the C-RNTI and contains a UL grant for a new transmission.

In some example embodiments, the device 210 may resume and/or (re-)initialize CSI reporting, SRS transmissions, and/or Type 1 CG when the BWP switching initiated by the device 210 happens based on an explicit indication from the device 220. For instance, the device 220 such as a network device may decide to resume the CSI reporting, SRS transmissions, and/or Type 1 CG only when it knows the channel is stably available without causing too much data loss on the uplink resources when LBT failure happens frequently. For example, the explicit indication may be RRC reconfiguration of the CSI configuration, and/or RRC reconfiguration of the SRS configuration, and/or RRC reconfiguration of the configured grant configuration. In other words, for UE initiated BWP switching, CG is only resumed when RRC reconfiguration for the CG happens; while for NW initiated BWP switching, the pre-configured CG (or generally CSI reporting, SRS transmissions, and/or Type 1 CG) is immediately resumed. In one alternative, receiving any RRC reconfiguration by the UE on the new active BWP can be regarded as resumption for the CSI reporting, SRS transmissions, and/or Type 1 CG, i.e., the configuration does not need to consider the CSI reporting, SRS transmissions, and/or Type 1 CG configuration itself. In some example embodiments, the explicit indication could be a new MAC CE defined for such purpose.

In some embodiments, a network device such as the device 220 can configure behaviors of a UE such as the device 210 when the Type 1 CG on the target UL BWP is (re-)initialized by the UE. For instance, the NW can configure whether it can be done immediately after switching to target UL BWP or only after RA procedure completion or with the explicit indication. For the foremost option, the UE may stop an ongoing RA procedure (if triggered for a SR) in case it can send a Buffer Status Report (BSR) in the Type 1 CG resources.

In some examples, a possible implementation into the TS 38.321 is given in the following.

5.8.2 Uplink

Upon configuration of a configured grant Type 1 for a Serving Cell by upper layers, the MAC entity shall:
1> store the uplink grant provided by upper layers as a configured uplink grant for the indicated Serving Cell.

Upon configuration or reconfiguration of a configured grant Type 1 for a Serving Cell by upper layers; or upon completing RRC reconfiguration after activating the active BWP autonomously by the MAC entity, the MAC entity shall:
1> initialise or re-initialise the configured uplink grant for the active BWP to start in the symbol according to timeDomainOffset and S (derived from SLIV as specified in TS 38.214 [7]), and to reoccur with periodicity.

5.15 Bandwidth Part (BWP) Operation
1> if a BWP is activated:
  2> transmit on UL-SCH on the BWP;
  2> transmit on RACH on the BWP, if PRACH occasions are configured;
  2> monitor the PDCCH on the BWP;
  2> transmit PUCCH on the BWP, if configured;
  2> report CSI for the BWP;
  2> transmit SRS on the BWP, if configured;
  2> receive DL-SCH on the BWP;
  2> (re-)initialize any suspended configured uplink grants of configured grant Type 1 on the active BWP according to the stored configuration, if any, and to start in the symbol according to rules in clause 5.8.2 if the BWP is not activated autonomously by the MAC entity.

In some examples, a possible implementation into the TS 38.321 is given in the following.

5.15 Bandwidth Part (BWP) Operation

For each activated Serving Cell configured with a BWP, the MAC entity shall:
1> if a BWP is activated:
  2> transmit on UL-SCH on the BWP;
  2> transmit on RACH on the BWP, if PRACH occasions are configured;
  2> monitor the PDCCH on the BWP;
  2> transmit PUCCH on the BWP, if configured;
  2> receive DL-SCH on the BWP;
  2> if the BWP is activated by the MAC entity itself upon initiation of Random Access procedure:
    3> if the ongoing Random Access procedure associated with this Serving Cell is successfully completed upon reception of this PDCCH addressed to C-RNTI (as in clauses 5.1.4 and 5.1.5); or specified
    3> if the activateGrantType1UponRAAllowed is set to true:
      4> (re-)initialize any suspended configured uplink grants of configured grant Type 1 on the active BWP according to the stored configuration, if any, and to start in the symbol according to rules in clause 5.8.2.
      4> report CSI for the BWP;
      4> transmit SRS on the BWP, if configured;
  2> else:
    3> report CSI for the BWP;
    3> transmit SRS on the BWP, if configured;
    3> (re-)initialize any suspended configured uplink grants of configured grant Type 1 on the active BWP according to the stored configuration, if any, and to start in the symbol according to rules in clause 5.8.2.

In some examples, a possible implementation into the TS 38.321 is given in the following.
1> if a BWP is activated:
  2> transmit on UL-SCH on the BWP;
  2> transmit on RACH on the BWP, if PRACH occasions are configured;
  2> monitor the PDCCH on the BWP;
  2> transmit PUCCH on the BWP, if configured;
  2> report CSI for the BWP unless the BWP is activated by the MAC entity itself upon initiation of Random Access procedure and the Random Access procedure is going;
  2> transmit SRS on the BWP, if configured, unless the BWP is activated by the MAC entity itself upon initiation of Random Access procedure and the Random Access procedure is going;
  2> receive DL-SCH on the BWP;
  2> if the BWP is activated autonomously by the MAC entity itself upon initiation of Random Access procedure:
    3> if the ongoing Random Access procedure associated with this Serving Cell is successfully completed upon reception of this PDCCH addressed to C-RNTI (as specified in clauses 5.1.4 and 5.1.5):
      4> (re-)initialize any suspended configured uplink grants of configured grant Type 1 on the active BWP according to the stored configuration, if any, and to start in the symbol according to rules in clause 5.8.2.
  2> else:
    3> (re-)initialize any suspended configured uplink grants of configured grant Type 1 on the active BWP according to the stored configuration, if any, and to start in the symbol according to rules in clause 5.8.2.

As such, with various proposed embodiments, the network device may be aware of when the Type 1 CG is resumed compared to the legacy behavior where the network does not know when RACH is triggered by the UE before contention resolution. Unaware UL transmission is waste of UE power and data, and may cause interference in either UL or DL transmissions of other UEs in the cell. The UE may not stop the RA procedure due to the Type 1 CG considered as valid grant which could end up to a deadlock where NW would not know the UE is attempting access with the Type 1 CG. The system efficiency and performance may be increased.

Figure 4:
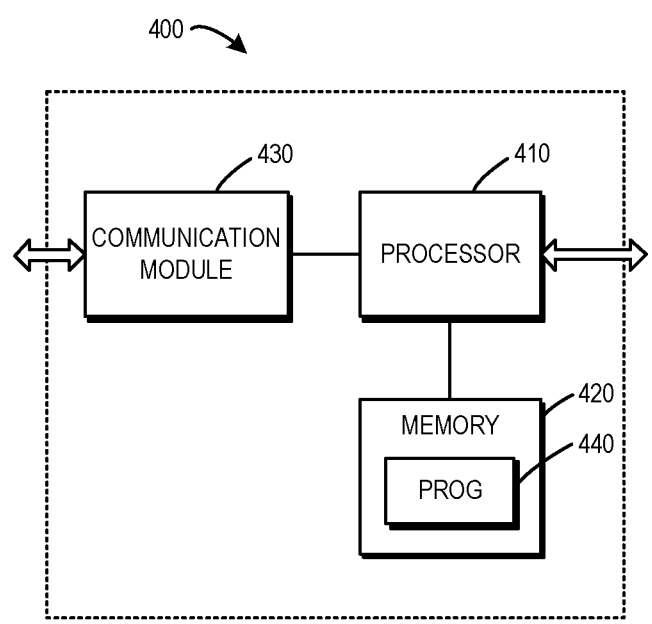
FIG. 4 illustrates a simplified block diagram of an apparatus that is suitable for implementing example embodiments of the present disclosure.

FIG. 4 is a simplified block diagram of an apparatus 400 that is suitable for implementing example embodiments of the present disclosure. The apparatus 400 can be implemented at or as a part of the device 210 or 220 as shown in FIG. 2.

As shown, the apparatus 400 includes a processor 410, a memory 420 coupled to the processor 410, a communication module 430 coupled to the processor 410, and a communication interface (not shown) coupled to the communication module 430. The memory 420 stores at least a program 440. The communication module 430 is for bidirectional communications, for example, via multiple antennas. The communication interface may represent any interface that is necessary for communication.

The program 440 is assumed to include program instructions that, when executed by the associated processor 410, enable the apparatus 400 to operate in accordance with the example embodiments of the present disclosure, as discussed herein with reference to FIGS. 2 and 3. The example embodiments herein may be implemented by computer software executable by the processor 410 of the apparatus 400, or by hardware, or by a combination of software and hardware. The processor 410 may be configured to implement various example embodiments of the present disclosure.

The memory 420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 420 is shown in the apparatus 400, there may be several physically distinct memory modules in the apparatus 400. The processor 410 may be of any type suitable to the local technical network, and may include one or more of general purpose computers, special purpose computers, microprocessors, digital signal processors (DSPs) and processors based on multicore processor architecture, as non-limiting examples. The apparatus 400 may have multiple processors, such as an application specific integrated circuit chip that is slaved in time to a clock which synchronizes the main processor.

When the apparatus 400 acts as the device 210 or 220, the processor 410 may implement the method 300 as described above with reference to FIGS. 2 and 3. All operations and features as described above with reference to FIGS. 2 and 3 are likewise applicable to the apparatus 400 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 as described above with reference to FIGS. 2 and 3. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, an apparatus comprises: at least one processor; and at least one memory including computer program code; the at least one memory and the computer program code configured to, with the at least one processor, cause the apparatus to: in response to first transmission being initiated from a device, select at least a first discontinuous reception group from a plurality of discontinuous reception groups, the plurality of discontinuous reception groups configured for the device and associated with a plurality of discontinuous reception configurations; and determine first active time for the first discontinuous reception group based on a first discontinuous reception configuration of the plurality of discontinuous reception configurations associated with the first discontinuous reception group, to allow the device to monitor second transmission to the device in the first active time.

In some example embodiments, the first transmission comprises random access on a special cell or a secondary cell, and the apparatus is caused to select at least the first discontinuous reception group by: selecting a discontinuous reception group of the plurality of discontinuous reception groups associated with the special cell as the first discontinuous reception group.

In some example embodiments, the random access is initiated by the device on the secondary cell, and the apparatus is caused to select at least the first discontinuous reception group by: selecting the first discontinuous reception group and a different second discontinuous reception group associated with the secondary cell from the plurality of discontinuous reception groups.

In some example embodiments, the first transmission comprises a scheduling request, and the apparatus is caused to select at least the first discontinuous reception group by: selecting a discontinuous reception group of the plurality of discontinuous reception groups associated with a cell for the device as the first discontinuous reception group.

In some example embodiments, wherein the cell for the device is determined from a group of at least one of: a cell associated with a logical channel for triggering the scheduling request; a cell associated with a logical channel with data to be transmitted; or a cell for carrying the scheduling request.

In some example embodiments, the scheduling request is sent by the device on a special cell or a secondary cell, and the cell for the device comprises the special cell.

In some example embodiments, the scheduling request is sent by the device on the secondary cell, and the apparatus is caused to select at least the first discontinuous reception group by: selecting the first discontinuous reception group and a different second discontinuous reception group associated with the secondary cell from the plurality of discontinuous reception groups.

In some example embodiments, the apparatus is further caused to: determine second active time for the second discontinuous reception group based on a different second discontinuous reception configuration of the plurality of discontinuous reception configurations associated with the second discontinuous reception group, to allow the device to monitor the second transmission to the device in the second active time.

In some example embodiments, the apparatus is caused to select at least the first discontinuous reception group by: selecting at least the first discontinuous reception group from the plurality of discontinuous reception groups based on an active configuration to activate at least the first discontinuous reception group.

In some example embodiments, the active configuration is further to activate a different third discontinuous reception group of the plurality of discontinuous reception groups, and the apparatus is caused to select at least the first discontinuous reception group by selecting the first discontinuous reception group and the third discontinuous reception group from the plurality of discontinuous reception groups based on the active configuration, and the apparatus is further caused to determine third active time for the third discontinuous reception group based on a different third discontinuous reception configuration of the plurality of discontinuous reception configurations associated with the third discontinuous reception group, to allow the device to monitor the second transmission to the device in the third active time.

In some example embodiments, the activation configuration is carried in physical layer signaling or medium access control layer signaling.

In some example embodiments, the apparatus is further caused to: in response to the first active time spanning over an occasion for wakeup signaling within a discontinuous reception cycle, select a different fourth discontinuous reception group from the plurality of discontinuous reception groups; and determine fourth active time within a next discontinuous reception cycle for the fourth discontinuous reception group based on a different fourth discontinuous reception configuration of the plurality of discontinuous reception configurations associated with the fourth discontinuous reception group.

In some aspects, a method comprises: in response to first transmission being initiated from a device, selecting at least a first discontinuous reception group from a plurality of discontinuous reception groups, the plurality of discontinuous reception groups configured for the device and associated with a plurality of discontinuous reception configurations; and determining first active time for the first discontinuous reception group based on a first discontinuous reception configuration of the plurality of discontinuous reception configurations associated with the first discontinuous reception group, to allow the device to monitor second transmission to the device in the first active time.

In some example embodiments, the first transmission comprises random access on a special cell or a secondary cell, and selecting at least the first discontinuous reception group comprises: selecting a discontinuous reception group of the plurality of discontinuous reception groups associated with the special cell as the first discontinuous reception group.

In some example embodiments, the random access is initiated by the device on the secondary cell, and selecting at least the first discontinuous reception group comprises: selecting the first discontinuous reception group and a different second discontinuous reception group associated with the secondary cell from the plurality of discontinuous reception groups.

In some example embodiments, the first transmission comprises a scheduling request, and selecting at least the first discontinuous reception group comprises: selecting a discontinuous reception group of the plurality of discontinuous reception groups associated with a cell for the device as the first discontinuous reception group.

In some example embodiments, the cell for the device is determined from a group of at least one of: a cell associated with a logical channel for triggering the scheduling request; a cell associated with a logical channel with data to be transmitted; or a cell for carrying the scheduling request.

In some example embodiments, the scheduling request is sent by the device on a special cell or a secondary cell, and the cell for the device comprises the special cell.

In some example embodiments, the scheduling request is sent by the device on the secondary cell, and selecting at least the first discontinuous reception group comprises: selecting the first discontinuous reception group and a different second discontinuous reception group associated with the secondary cell from the plurality of discontinuous reception groups.

In some example embodiments, the method further comprises: determining second active time for the second discontinuous reception group based on a different second discontinuous reception configuration of the plurality of discontinuous reception configurations associated with the second discontinuous reception group, to allow the device to monitor the second transmission to the device in the second active time.

In some example embodiments, selecting at least the first discontinuous reception group comprises: selecting at least the first discontinuous reception group from the plurality of discontinuous reception groups based on an active configuration to activate at least the first discontinuous reception group.

In some example embodiments, the active configuration is further to activate a different third discontinuous reception group of the plurality of discontinuous reception groups, and selecting at least the first discontinuous reception group comprises selecting the first discontinuous reception group and the third discontinuous reception group from the plurality of discontinuous reception groups based on the active configuration, and the method further comprises determining third active time for the third discontinuous reception group based on a different third discontinuous reception configuration of the plurality of discontinuous reception configurations associated with the third discontinuous reception group, to allow the device to monitor the second transmission to the device in the third active time.

In some example embodiments, the activation configuration is carried in physical layer signaling or medium access control layer signaling.

In some example embodiments, the method further comprises: in response to the first active time spanning over an occasion for wakeup signaling within a discontinuous reception cycle, selecting a different fourth discontinuous reception group from the plurality of discontinuous reception groups; and determining fourth active time within a next discontinuous reception cycle for the fourth discontinuous reception group based on a different fourth discontinuous reception configuration of the plurality of discontinuous reception configurations associated with the fourth discontinuous reception group.

In some aspects, an apparatus comprises: means for in response to first transmission being initiated from a device, selecting at least a first discontinuous reception group from a plurality of discontinuous reception groups, the plurality of discontinuous reception groups configured for the device and associated with a plurality of discontinuous reception configurations; and means for determining first active time for the first discontinuous reception group based on a first discontinuous reception configuration of the plurality of discontinuous reception configurations associated with the first discontinuous reception group, to allow the device to monitor second transmission to the device in the first active time.

In some example embodiments, the first transmission comprises random access on a special cell or a secondary cell, and the means for selecting at least the first discontinuous reception group comprises: means for selecting a discontinuous reception group of the plurality of discontinuous reception groups associated with the special cell as the first discontinuous reception group.

In some example embodiments, the random access is initiated by the device on the secondary cell, and the means for selecting at least the first discontinuous reception group comprises: means for selecting the first discontinuous reception group and a different second discontinuous reception group associated with the secondary cell from the plurality of discontinuous reception groups.

In some example embodiments, the first transmission comprises a scheduling request, and the means for selecting at least the first discontinuous reception group comprises: means for selecting a discontinuous reception group of the plurality of discontinuous reception groups associated with a cell for the device as the first discontinuous reception group.

In some example embodiments, the cell for the device is determined from a group of at least one of: a cell associated with a logical channel for triggering the scheduling request; a cell associated with a logical channel with data to be transmitted; or a cell for carrying the scheduling request.

In some example embodiments, the scheduling request is sent by the device on a special cell or a secondary cell, and the cell for the device comprises the special cell.

In some example embodiments, the scheduling request is sent by the device on the secondary cell, and the means for selecting at least the first discontinuous reception group comprises: means for selecting the first discontinuous reception group and a different second discontinuous reception group associated with the secondary cell from the plurality of discontinuous reception groups.

In some example embodiments, the apparatus further comprises: means for determining second active time for the second discontinuous reception group based on a different second discontinuous reception configuration of the plurality of discontinuous reception configurations associated with the second discontinuous reception group, to allow the device to monitor the second transmission to the device in the second active time.

In some example embodiments, the means for selecting at least the first discontinuous reception group comprises: means for selecting at least the first discontinuous reception group from the plurality of discontinuous reception groups based on an active configuration to activate at least the first discontinuous reception group.

In some example embodiments, the active configuration is further to activate a different third discontinuous reception group of the plurality of discontinuous reception groups, and the means for selecting at least the first discontinuous reception group comprises selecting the first discontinuous reception group and the third discontinuous reception group from the plurality of discontinuous reception groups based on the active configuration, and the apparatus further comprises means for determining third active time for the third discontinuous reception group based on a different third discontinuous reception configuration of the plurality of discontinuous reception configurations associated with the third discontinuous reception group, to allow the device to monitor the second transmission to the device in the third active time.

In some example embodiments, the activation configuration is carried in physical layer signaling or medium access control layer signaling.

In some example embodiments, the apparatus further comprises: means for in response to the first active time spanning over an occasion for wakeup signaling within a discontinuous reception cycle, selecting a different fourth discontinuous reception group from the plurality of discontinuous reception groups; and determining fourth active time within a next discontinuous reception cycle for the fourth discontinuous reception group based on a different fourth discontinuous reception configuration of the plurality of discontinuous reception configurations associated with the fourth discontinuous reception group.

In some aspects, a computer readable storage medium comprises program instructions stored thereon, the instructions, when executed by a processor of a device, causing the device to perform the method according to some example embodiments of the present disclosure.

What is claimed is:

1. An apparatus, comprising:
   at least one processor; and
   at least one memory including computer program code;
   the at least one memory and the computer program code configured to, with the at least one processor, cause the apparatus at least to:
      in response to a random access or a scheduling request being initiated by the apparatus, select at least a first discontinuous reception group and a second discontinuous reception group from a plurality of discontinuous reception groups, the plurality of discontinuous reception groups are configured for the apparatus and associated with a plurality of discontinuous reception configurations;
      determine first active time for the first discontinuous reception group based on a first discontinuous reception configuration of the plurality of discontinuous reception configurations associated with the first discontinuous reception group, to monitor second transmission to the apparatus in the first active time; and
      determine second active time for the second discontinuous reception group based on a second discontinuous reception configuration of the plurality of discontinuous reception configurations associated with the second discontinuous reception group, to monitor third transmission to the apparatus in the second active time.

2. The apparatus of claim 1, wherein the random access or the scheduling request comprises random access on a special cell or a secondary cell, and the apparatus is caused to select at least the first discontinuous reception group by:
   selecting a discontinuous reception group of the plurality of discontinuous reception groups associated with the special cell as the first discontinuous reception group.

3. The apparatus of claim 1, wherein the random access is initiated by the apparatus on a secondary cell, and the apparatus is caused to:
   select the first discontinuous reception group and the second discontinuous reception group associated with the secondary cell from the plurality of discontinuous reception groups.

4. The apparatus of claim 1, wherein the random access or the scheduling request comprises a scheduling request, and the apparatus is caused to select at least the first discontinuous reception group by:
   selecting a discontinuous reception group of the plurality of discontinuous reception groups associated with a cell for the apparatus as the first discontinuous reception group.

5. The apparatus of claim 4, wherein the cell for the apparatus is determined from a group of at least one of:
   a cell associated with a logical channel for triggering the scheduling request;
   a cell associated with a logical channel with data to be transmitted; or
   a cell for carrying the scheduling request.

6. The apparatus of claim 4, wherein the scheduling request is sent by the apparatus on a special cell or a secondary cell, and the cell for the apparatus comprises the special cell.

7. The apparatus of claim 6, wherein the scheduling request is sent by the apparatus on the secondary cell, and the apparatus is caused to:
   select the first discontinuous reception group and the second discontinuous reception group associated with the secondary cell from the plurality of discontinuous reception groups.

8. The apparatus of claim 1, wherein the apparatus is caused to select at least the first discontinuous reception group by:
   selecting at least the first discontinuous reception group from the plurality of discontinuous reception groups based on an active configuration to activate at least the first discontinuous reception group.

9. The apparatus of claim 8, wherein the active configuration is further to activate a different third discontinuous reception group of the plurality of discontinuous reception groups, and the apparatus is caused to select at least the first discontinuous reception group by selecting the first discontinuous reception group and the third discontinuous reception group from the plurality of discontinuous reception groups based on the active configuration, and
   wherein the apparatus is further caused to determine third active time for the third discontinuous reception group based on a different third discontinuous reception configuration of the plurality of discontinuous reception configurations associated with the third discontinuous reception group, to allow the apparatus to monitor the second transmission to the apparatus in the third active time.

10. The apparatus of claim 8, wherein the activation configuration is carried in physical layer signaling or medium access control layer signaling.

11. The apparatus of claim 1, wherein the apparatus is further caused to:
   in response to the first active time spanning over an occasion for wakeup signaling within a discontinuous reception cycle, select a different fourth discontinuous reception group from the plurality of discontinuous reception groups; and
   determine fourth active time within a next discontinuous reception cycle for the fourth discontinuous reception group based on a different fourth discontinuous reception configuration of the plurality of discontinuous reception configurations associated with the fourth discontinuous reception group.

12. A method, comprising:
   in response to a random access or a scheduling request being initiated by a device, selecting at least a first discontinuous reception group and a second discontinuous reception group from a plurality of discontinuous reception groups, the plurality of discontinuous reception groups are configured for the device and associated with a plurality of discontinuous reception configurations;
   determining first active time for the first discontinuous reception group based on a first discontinuous reception configuration of the plurality of discontinuous reception configurations associated with the first discontinuous reception group, to monitor second transmission to the device in the first active time; and determining second active time for the second discontinuous reception group based on a second discontinuous reception configuration of the plurality of discontinuous reception configurations associated with the second discontinuous reception group, to allow the device to monitor third transmission to the apparatus in the second active time.

13. The method of claim 12, wherein the random access or the scheduling request comprises random access on a special cell or a secondary cell, and selecting at least the first discontinuous reception group comprises:

selecting a discontinuous reception group of the plurality of discontinuous reception groups associated with the special cell as the first discontinuous reception group.

14. The method of claim 12, wherein the random access is initiated by the device on a secondary cell, and:

selecting the first discontinuous reception group and a different second discontinuous reception group associated with the secondary cell from the plurality of discontinuous reception groups.

15. The method of claim 12, wherein the random access or the scheduling request comprises a scheduling request, and selecting at least the first discontinuous reception group comprises:

selecting a discontinuous reception group of the plurality of discontinuous reception groups associated with a cell for the device as the first discontinuous reception group.

16. The method of claim 15, wherein the cell for the device is determined from a group of at least one of:

a cell associated with a logical channel for triggering the scheduling request;

a cell associated with a logical channel with data to be transmitted; or a cell for carrying the scheduling request.

17. The method of claim 15, wherein the scheduling request is sent by the device on a special cell or a secondary cell, and the cell for the device comprises the special cell.

18. The method of claim 12, wherein selecting at least the first discontinuous reception group comprises:

selecting at least the first discontinuous reception group from the plurality of discontinuous reception groups based on an active configuration to activate at least the first discontinuous reception group.

19. A non-transitory computer readable medium comprising program instructions stored thereon for performing at least:

in response to a random access or a scheduling request being initiated by a device, selecting at least a first discontinuous reception group and a second discontinuous reception group from a plurality of discontinuous reception groups, the plurality of discontinuous reception groups are configured for the device and associated with a plurality of discontinuous reception configurations;

determining first active time for the first discontinuous reception group based on a first discontinuous reception configuration of the plurality of discontinuous reception configurations associated with the first discontinuous reception group, to monitor second transmission to the device in the first active time; and determining second active time for the second discontinuous reception group based on a second discontinuous reception configuration of the plurality of discontinuous reception configurations associated with the second discontinuous reception group, to monitor third transmission to the apparatus in the second active time.

\* \* \* \* \*